Patented Sept. 17, 1940

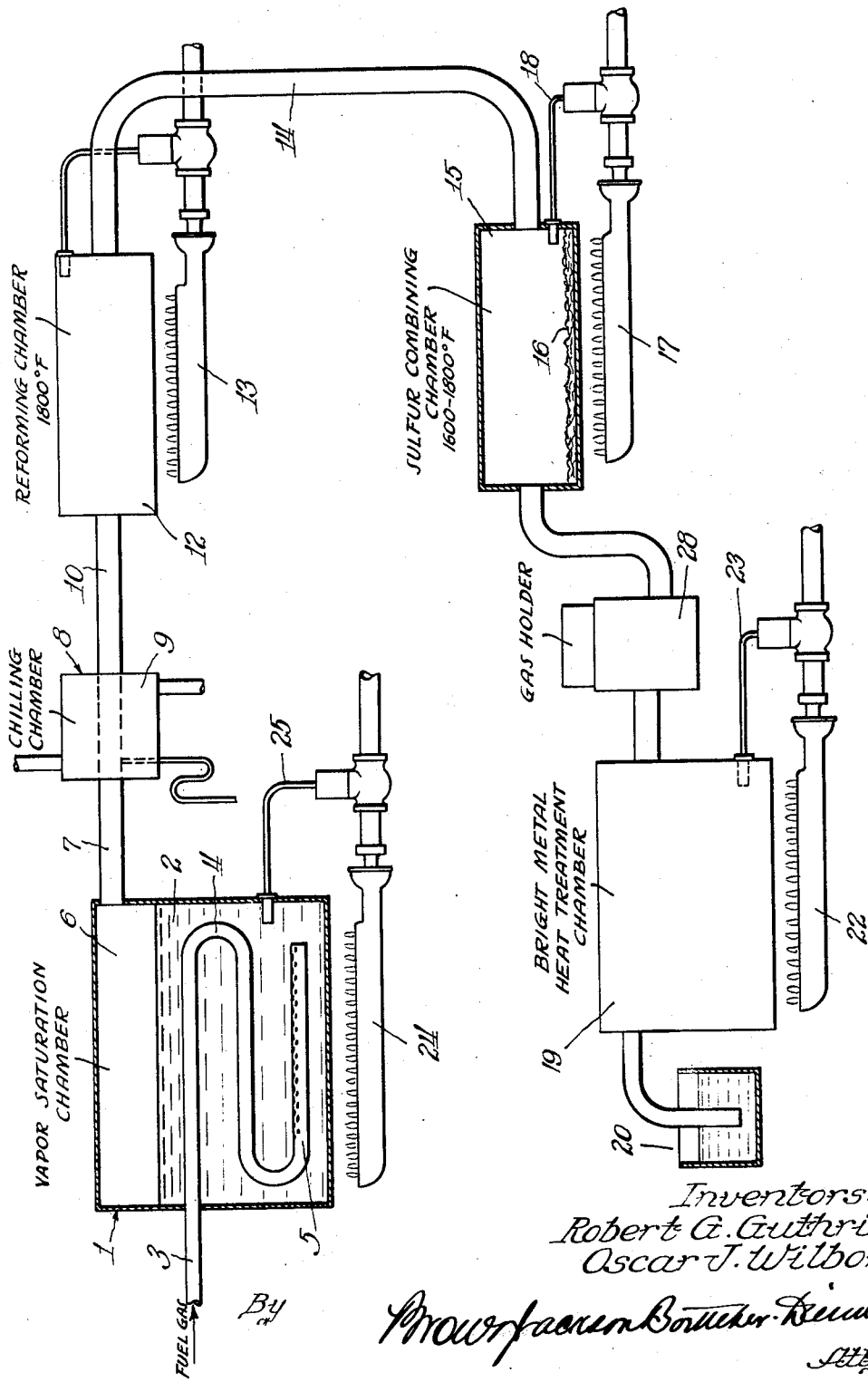

2,214,926

UNITED STATES PATENT OFFICE 2,214,926

DESULPHURIZING GAS

Robert G. Guthrie and Oscar J. Wilbor, Chicago, Ill., assignors to Peoples Gas By-Products Corporation, Chicago, Ill., a corporation of Illinois Application November 10, 1938, Serial No. 239,747

3 Claims. (Cl. 252—373)

The present invention relates to the preparation of gases for use as a furnace atmosphere in the so-called "bright heat treatment of metals." An example of such treatment is the bright annealing of steel. Other metals are also bright heat treated.

Until recent times, little attention has been paid to the furnace atmosphere in the heat treatment of metals. However, there is a demand for a way to heat-treat finished metal parts or articles at elevated temperatures, for example, annealing of steel or other metals, without change of the surface as, for example, by oxidation, decarburization, or both, or staining by sulphur or the like.

The production of special gases for the above purpose may be accomplished in various ways. Usually it is the practice to take available fuel gases and convert, transform, or reform them into gases suitable for the purpose. The preferred manner of preparing the fuel gas for this purpose is that disclosed in our Patent No. 2,164,403, wherein the fuel gas is physically combined with a definite ratio of moisture and subjected to a reforming temperature to produce a chemically reformed gas. The resulting gas contains mainly carbon monoxide and hydrogen in suitable proportion to prevent either decarburizing or carburizing of a steel surface or the like. Free moisture and oxygen, either of which is undesirable, are eliminated to a degree which renders the gas suitable for the purpose.

Now it is known that all of the natural or artificial gaseous fuels contain sulphur, either as hydrogen sulphide, thiophene, mercaptans, or as heterocyclic compounds containing sulphur in combined form. Sulphur compounds, even in minute quantities, are highly objectionable because they stain the bright metallic surfaces. There are known processes for removing hydrogen sulphide but, as heretofore practiced, the efficiency of removal is rarely 100%. For the bright heat treatment of metals substantially 100% removal of sulphur is required, not only in the form of hydrogen sulphide but also the organic sulphur compounds must be eliminated. Removal of the hydrogen sulphide in accordance with known practices is therefore peculiarly ineffective, both because the type of removal heretofore used is not suitable and because the removal of hydrogen sulphide is only part of the problem.

For the production of the best type of gas atmosphere for bright heat treatment the gas is required to be very carefully reformed, all as disclosed in our patent above referred to. We have discovered that the organic sulphur compounds may be broken down and resolved into simpler compounds which are more readily removed, by the reforming treatment to which the gas as a whole is subjected. This treatment involves the introduction of carefully regulated amounts of water in the form of vapor and subjection of the moistened gas as a whole to a reforming temperature of around 1800°. Reforming under the above conditions of moisture and temperature is effective not only upon the hydrocarbons as disclosed according to my above mentioned patent but it also breaks down the mercaptans, thiophenes, carbon disulphide, and other organic sulphur compounds into carbon monoxide, hydrogen and hydrogen sulfide. Then we employ a high temperature desulphurization which is of the desired high efficiency for removing hydrogen sulphide and any such sulphur compounds as exist in the gas after the reforming of the gas as a whole at the temperatures required for this purpose, usually about 1800° F. For this step we employ a chamber in which the hot gas from the reforming chamber is contacted with the oxide of an alkaline earth metal, held at a temperature of 1600° F., approximately.

Thus the unique phases of our invention include, first, the concept of cracking or reforming the organic sulphur compounds into hydrogen sulphide, with perhaps other sulphur compounds which are more readily removable than the original compounds, and removing the hydrogen sulphide, with such other more removable sulphur compounds as are formed in the cracking or reforming; second, we employ an unusually high temperature of the sulphur removing chamber and the alkaline earth metal oxide therein; and, third, we employ, as the preferred alkaline earth metal oxide, the oxide of barium.

The object of our invention is the desulphurization of gases, particularly reformed fuel gases to be used for the bright heat treatment of metals. The desulphurization must be accomplished in a way which will not produce or release compounds such as carbon dioxide, oxygen or water to an injurious degree, and at the same time it must be so complete as to avoid any staining of the surface of the metal to be treated.

Now in order to acquaint those skilled in the art with the manner of constructing and operating an installation embodying our invention, we shall describe, in connection with the accompanying drawing, one manner in which the invention may be carried out.

We are aware that for various situations and purposes there are numerous methods of removing sulphur from gases and the like, but in no case with which we are familiar is the requirement for sulphur removal so exacting and the requirement for avoiding the production of other harmful constituents or compounds so severe as in the preparation of a gas to be used as an atmosphere in the bright heat treatment of metals.

Referring now to the accompanying drawing, the fuel gas entering the system by way of pipe 3, which gas may be natural or artificial illuminating gas, producer gas or the like, is first analyzed and a determination is made of the proper amount of water vapor required to be present in the fuel gas to reform the hydrocarbons of the fuel gas and the water vapor into carbon monoxide and hydrogen without uncombined excess of either. Then the gas is saturated in the tank 1, at a specific temperature and pressure, with water vapor so that at the dewpoint or complete saturation exactly the right ratio of water to hydrocarbon to produce a reforming into carbon monoxide and hydrogen will be secured.

The tank 1 is provided with a charge of water 2. By means of the inlet pipe 3 the gas to be treated is introduced through the coil 4 to the nozzle or perforated pipe 5, whereby the gas is brought to exactly the same temperature as the water and is then bubbled through the water to become saturated with water vapor and to be collected in the gas space 6. The gas and the water bath 2 are therefore at the same temperature and the gas becomes saturated at that temperature.

A suitable pressure regulator may be provided in the pipe 3 to maintain the pressure in the gas space 6 at the desired value. From the gas space 6 the saturated gas is led by way of pipe 7 to the chilling chamber 8 where, by means of a suitable water jacket 9, the gas is chilled, preferably a small amount, to be sure that the dewpoint has been attained. From thence through the pipe 10 the saturated gas is led to the reforming chamber 12. Here, as by means of the burner 13 or other suitable heating means, preferably under automatic control 24, the temperature in the reforming chamber is maintained at approximately 1800° F., and the gas which previously existed as a hydrocarbon with various impurities is converted mainly into carbon monoxide and hydrogen gas. From the reforming chamber the reformed gas is conducted, as by a conduit 14, to the sulphur combining chamber 15. In this chamber a charge of an oxide of an alkaline earth metal, preferably barium oxide, shown at 16 is maintained at a temperature of approximately 1600° F. to 1800° F. Calcium oxide may alternatively be employed, but we prefer barium oxide. The lower temperature of approximately 1600° F. is usually sufficient to produce satisfactory sulphur removal. The chamber is heated by any suitable heating means, as for example the burner 17 under thermostatic control 18, to keep the sulphur combining chamber at the desired temperature.

The gas is led through this sulphur removal chamber at a relatively low velocity. We recommend a linear speed of about three to six inches per second.

The gas reforming chamber and the sulphur combining chamber may be heated by the same heating means, and it is advantageous to have the gas coming hot from the reforming chamber to enter immediately the sulphur combining chamber. From the sulphur combining chamber the gas may be led to a gas holder such as 28 or directly to the metal heat treatment chamber 19 wherein metal parts are subjected to a bright heat treatment, for example, bright annealing. The excess of gas may be passed out to atmosphere or, wherever desired, through the water seal 20.

The heat treating chamber is heated by any suitable means, such as the burner 22, preferably under thermostatic control 23. The saturation chamber 1 is preferably heated continuously by a heater such as the burner 24 under automatic thermostatic control 25, although it is possible in some cases to provide the necessary heat for maintaining the body of liquid 2 at the desired temperature by heating the entering fuel gas.

The fuel gas entering by way of the pipe 3 contains sulphur in the form of compounds which may be hydrogen sulphide, thiophene, mercaptans, or heterocyclic compounds containing sulphur in combined form. The hydrogen sulphide may be fairly easily removed from gas, but the mercaptans, thiophenes and the like are not readily absorbable or removable. Thus the gas entering the pipe 3 might previously have the hydrogen sulphide removed by known processes, but the organic sulphur compounds are very difficult to remove, since they will not break down readily except at such temperatures as are required for reforming or cracking of the fuel gas.

It is known that in the bright heat treatment of metals the carbon monoxide tends to carburize and the hydrogen tends to decarburize the metal surfaces, but the net effect of these two constituents of a properly reformed gas is negligible. Carbon dioxide and water are oxidizing agents which are highly undesirable in the atmosphere of a metal treating chamber.

In the reforming chamber the organic sulphur compounds are broken down and the sulphur appears mainly as hydrogen sulphide. Unless particularly effective means for sulphur removal are provided, the sulphur compounds, either as hydrogen sulphide or other compounds, will, upon entering the metal treating chamber 19, tend to stain the surfaces of the bright metals being treated. We have employed numerous media for sulphur removal and find that barium oxide is most suitable for our purposes, primarily in that there appears to be a minimum formation of $H_2O$ in the release of oxygen from the barium oxide. Also, it appears that barium oxide will not react with water vapor as easily as does calcium oxide, and the results obtained by employing barium oxide are generally superior in respect to sulphur removal for the bright heat treatment of metals. Furthermore, it appears that barium carbonate does not break down at the temperatures at which our process operates, whereas calcium carbonate does.

We do not wish to be limited to the use of barium oxide, although it is the preferred alkaline earth oxide.

The secret of the successful removal of sulphur compounds is first to subject the gases to the reforming operation, which breaks the organic sulphur compounds down to a form where they can be removed without affecting the gas being treated, and then, preferably while the gases are at an elevated temperature, to contact them with barium oxide or other suitable oxides of alkaline earth metals at temperatures around 1600° F. to 1800° F. Such sulphur compounds as escape conversion into hydrogen sulphide in the reforming chamber, if any, appear to be either combined in the sulphur combining chamber or broken up and combined by contact with the alkaline earth metal oxide 16 in the chamber 15.

With the process of our invention we have secured highly satisfactory results in the production of an atmosphere for bright annealing or like heat treatment of metals producing a gas which, particularly in the case of steel surfaces, will neither carburize nor decarburize nor oxidize, nor stain with sulphur.

Obviously the particular metal under treatment is not of the essence of the invention. It appears that the successful removal of the organic sulphur compounds lies in the subjection of the gas to a reforming or cracking temperature in advance of contact with the alkaline earth metal oxide, such as barium oxide, at an elevated temperature.

A temperature of approximately 1800° F. appears to be necessary to insure the breakdown (decomposition) or reforming of the organic sulphur compounds whereby to convert the sulphur into hydrogen sulphide. For the efficient removal of hydrogen sulphide the oxide of the alkaline earth metal should be raised to approximately 1600° F. Hence, in the specific preferred practice of our invention, the decomposition or reforming step is first carried out at approximately 1800° F. and then the desulphurizing step is carried out at approximately 1600° F. However, we do not wish to be limited to the specific temperatures nor to the specific preferred steps, as those skilled in the art will appreciate from the above specification that while the two effects, namely, breakdown or reforming of the sulphur compounds and absorption or removal of the resultant sulphur compound or compounds is best accomplished in the manner above indicated, under certain circumstances the two effects may be carried on in the same treating chamber, or in different parts of the same chamber.

We claim:

1. Method of preparing a gas suitable for use as a furnace atmosphere in the heat treatment of metals, which comprises adding water vapor in predetermined proportion to a raw fuel gas containing hydrogen sulphide and organic sulphur compounds as impurities, subjecting the gas and water vapor to a reforming temperature of approximately 1800° F. to reform the gas into carbon monoxide and hydrogen and to break down the organic sulphur compounds and reform them substantially into hydrogen sulphide, and removing the hydrogen sulphide by contact of the hot gas with barium oxide at a temperature of approximately 1600° F.

2. Method of preparing a gas suitable to serve as an atmosphere for the bright heat treatment of metals, which comprises charging a fuel gas which contains organic sulphur compounds as impurities with water vapor, subjecting the gas to reforming temperature to produce carbon monoxide and hydrogen, the organic sulphur compounds being at the same time converted to hydrogen sulphide, and contacting the reformed gas with an oxide of an alkaline earth metal at a temperature of substantially 1600° to 1800° F. to remove both the hydrogen sulphide and the remaining organic sulphur compounds.

3. Method of preparing a gas suitable to serve as a furnace atmosphere for the bright heat treatment of metals which comprises adding controlled amounts of moisture to raw fuel gas containing hydrocarbons and organic sulfur compounds, subjecting the moistened gas to a reforming temperature of approximately 1800° F. to reform the hydrocarbons into hydrogen and carbon monoxide and the organic sulfur compounds into hydrogen, carbon monoxide and hydrogen sulfide, then removing hydrogen sulfide by contacting the hot gas with the oxide of an alkaline earth metal at approximately 1600° F. to 1800° F.

ROBERT G. GUTHRIE.
OSCAR J. WILBOR.